(12) United States Patent
Gregg (10) Patent No.: US 9,248,967 B1
(45) Date of Patent: Feb. 2, 2016

(54) HOSE HANDLE SYSTEMS

(71) Applicant: Dale Gregg, Edmonton (CA)

(72) Inventor: Dale Gregg, Edmonton (CA)

( * ) Notice: Subject to any disclaimer, the term of this patent is extended or adjusted under 35 U.S.C. 154(b) by 93 days.

(21) Appl. No.: 14/265,597

(22) Filed: Apr. 30, 2014

Related U.S. Application Data (60) Provisional application No. 61/822,794, filed on May 13, 2013.

(51) Int. Cl.
*B65G 7/12* (2006.01)

(52) U.S. Cl.
CPC ........................................ *B65G 7/12* (2013.01)

(58) Field of Classification Search
CPC ............ B65G 7/12; F16L 3/1211; F16L 3/10; F16L 3/1033; F16L 3/1041
USPC .................. 294/16, 106, 15, 26, 62, 137–172; 248/76
See application file for complete search history.

(56) References Cited

U.S. PATENT DOCUMENTS

| | | | |
|---|---|---|---|
| 601,639 A | 4/1898 | Doyle | |
| 877,012 A * | 1/1908 | Sullivan | B65G 7/12 248/76 |
| 1,275,068 A * | 8/1918 | Messiter | E04C 5/10 248/78 |
| 2,819,111 A * | 1/1958 | Cozzens | F16L 1/06 294/106 |
| 2,873,995 A * | 2/1959 | Turner | B65G 7/12 24/517 |
| 2,994,551 A * | 8/1961 | Garnett, Jr. | E21B 19/00 294/104 |
| 4,072,369 A * | 2/1978 | Segreto | E21B 19/24 175/325.7 |
| 4,392,676 A | 7/1983 | Jones et al. | |
| 4,470,177 A | 9/1984 | Ganung | |
| 4,697,830 A * | 10/1987 | Wood | B25B 5/147 138/96 T |
| 4,723,800 A * | 2/1988 | Sanders | B25B 5/147 294/106 |
| 4,838,465 A * | 6/1989 | Metzger | E04G 21/04 222/526 |
| 4,856,834 A | 8/1989 | Lancaster et al. | |
| 6,416,096 B1 * | 7/2002 | Stefanik | H01J 9/003 29/758 |
| 7,275,777 B1 * | 10/2007 | Urdiales | B65G 7/12 294/104 |
| 7,730,588 B1 | 6/2010 | Bernier | |
| 8,056,947 B2 * | 11/2011 | Davidson | E21B 19/14 294/106 |
| 8,348,317 B1 * | 1/2013 | Bird | A45F 5/00 248/75 |

* cited by examiner

*Primary Examiner* — Gabriela Puig
(74) *Attorney, Agent, or Firm* — RG Patent Consulting, LLC; Rachel Gilboy (57) ABSTRACT

A hose handle system is a pump suction hose clamp or pipe clamp with a handle attached that a user can place on a suction hose or the like to lift and move the hose from one location to another. The hose handle system is designed for easy single handed operation and provides quick attachment and positive grip of the connection. The hose handle clamp assembly has a left clamp side that is hinged to a right clamp side, and the right clamp side is attached to a clamp main body. A clamp lock is pivotally attached to the left side of the clamp main body and is able to lock the left clamp side to the clamp main body thereby locking the clamp onto the hose.

19 Claims, 5 Drawing Sheets

HOSE HANDLE SYSTEMS

CROSS-REFERENCE TO RELATED APPLICATION

The present application is related to and claims priority from prior provisional application Ser. No. 61/822,794, filed May 13, 2013 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates generally to the field of handling devices and more specifically relates to a hose handling system.

2. Description of the Related Art

Fluids are being pumped through fluid transmission lines in nearly every industry in the modern world. These fluid pumping systems are widely diverse and in use on some scale from large industries all the way down modern family residences. The substance being pumped may be petroleum, water, or even a gas, and the fluid or gas transmission lines may be fixed or non-movable, but can be portable in some situations. As an example, petroleum trucking companies use portable, flexible hoses for moving the fluid from a transport vehicle to an underground tank at the end-point destination.

Many other industries use portable pumps, which use portable, flexible hoses, to pump fluids from one location to another. The mining, construction, and environmental fields, to name a few, extensively use portable pumps having suction hoses that are heavy and bulky to handle. These portable pumps generally have semi-flexible suction hoses that can range in size from 1½ inches to 8 inches in diameter, and have to be maneuvered by hand. A 1½ or a 2 inch hose may not be considered heavy or strenuous to move by hand, but larger diameter hoses can be very cumbersome and exceedingly heavy to handle. This is especially true when the hose is filled, or partially filled, with water. Water weights 8.34 lbs. per gallon and the weight multiplies as the hose length increases. A 10 foot length of 4 inch suction hose could weigh between 5 and 15 pounds depending on the quality, but when full of water could weigh close to 70 pounds. A 6 inch suction hose can weigh close to 125 pounds when full. This 'carried weight' can easily lead to work place injury if not properly lifted and handled.

Suction hoses are generally in wet and muddy environments which makes them slippery, and much more difficult to lift and pull to a new location when relocation becomes necessary. Many methods have been employed to attempt to make the job easier, but often require attachment of a device that still requires lifting the hose from the mud by hand without a good grip, and more than a practical time limit to install the device and remove it again. When working with crews in industrial environments, extra time may not be an option. Taking extra time to install a lifting device on a hose can be viewed as an unnecessary time waster if it is possible to be lifted by hand. A solution that makes moving hoses or pipes without the added installation and removal time and which makes the lifting faster and easier is needed. It is desirable generally to have an efficient and comfortable means by which long cylindrical objects can be held and moved with relative ease to promote worker efficiency and safety.

Various attempts have been made to solve the above-mentioned problems such as those found in U.S. Pub. No. 7,730,588 to Claude Bernier, U.S. Pat. No. 8,348,317 to Mark C. Bird, U.S. Pat. No. 601,639 to Philip J. Doyle, U.S. Pat. No. 4,470,177 to George Ganung, U.S. Pat. No. 4,392,676 to Martin B. Harrison, and U.S. Pat. No. 4,856,834 to Richard J. Everding. This art is representative of carrying devices. None of the above inventions and patents, taken either singly or in combination, is seen to describe the invention as claimed.

Ideally, a hose gripping device should provide easy single-handed operation and, yet would operate reliably and be manufactured at a modest expense. Thus, a need exists for a reliable hose handling system to avoid the above-mentioned problems.

BRIEF SUMMARY OF THE INVENTION

In view of the foregoing disadvantages inherent in the known hose gripping and object handling device art, the present invention provides a novel hose handle system. The general purpose of the present invention, which will be described subsequently in greater detail, is to provide a single handed operable secure clamp-on hose handle system.

The present invention, hose handling system as disclosed herein, preferably comprises a hose handle clamp assembly having a left clamp side with a first pivot through-hole, a clamp-lock cam, a left arcuate-hose-grip portion, a right clamp side having a second pivot through-hole and a first hinge-pin, a first main pivot-hinge extension having a first main pivot-hinge-orifice with a second hinge-pin, a right arcuate-hose-grip portion, a clamp main body having a carry handle, a second main pivot-hinge extension having a second main pivot-hinge-orifice, and a clamp lock.

The hose handle clamp assembly is useful for quickly coupling to a cylindrical object such as a hose or a pipe using a single handed operation, and carrying the cylindrical object (such as a hose or pipe or the like) from a first location to a second location. In general, the hose handle clamp assembly may comprise a left clamp side, a right clamp side, and a clamp main body operatively and hingedly attached one to another in respective order. A second main pivot-hinge extension is located on a lower right side of the clamp main body which hingedly attaches to the right clamp side and the right clamp side hingedly attaches to the left clamp side. The left clamp side comprises a left arcuate-hose-grip portion having a top portion and a bottom portion.

A first pivot through-hole is transversely located through the top portion of the left clamp side. A first hinge pin may have a first bushing having a first bolt with a first bushing and a first bolt removably inserted through the first pivot through-hole of the left clamp side and the second pivot through-hole of the right clamp side, thereby hingedly coupling the left clamp side to the right clamp side. The clamp lock is rotatably attached to the edge of the left side of the clamp main body via a clamp lock hinge. The clamp-lock cam is integral with the left clamp side and located tangential to the convex side of the top portion of the left clamp side. The clamp lock further comprises a locking cog. The locking cog is able to frictionally engage the clamp lock cam to place the hose handle clamp assembly in a locked condition about the outer periphery of a cylindrical object such as a suction hose or a pipe.

The clamp lock further comprises a thumb lever with the thumb lever located at an opposing end of the clamp lock from the locking cog. The left side of the clamp main body may comprise a semi-circular recess that the back side of the clamp-lock cam is able to be nestably located within during a locked clamp condition. The clamp main body comprises an arcuate hinge slot located in the left side of the clamp main body between the front side and the back side having a first roll-pin orifice transversely passing through the arcuate hinge slot. The clamp lock comprises a second roll-pin orifice. The first roll-pin orifice and the second roll-pin orifice align and are rotatably coupled via a frictionally inserted roll-pin. The arcuate hinge slot is located within a rounded protrusion on the left side of the clamp main body.

The front side of the clamp-lock cam in this particular embodiment is frictionally engaged with the cog of the clamp lock during a locked condition. The right clamp side comprises the right arcuate-hose-grip portion, the right arcuate-hose-grip portion comprising an upper portion and a lower portion. The clamp lock cam of the left clamp side is located on an elongated protrusion, which is integral with the left clamp side and upwardly divergent from a curvature of the outer arcuate surface of the left clamp side. The first main pivot-hinge extension of the right clamp side is also an elongated protrusion. The elongated protrusion is integral with the right clamp side and upwardly divergent from the curvature of the outer arcuate surface. The left clamp side and the right clamp side each are narrower at the lowermost end than at the uppermost end. The second pivot through-hole is transversely located through the upper portion of the right clamp side. The first-main pivot-hinge-extension is integral with the right clamp side and located tangential to an outer curvature of the upper portion of the right clamp side. The first-main pivot-hinge-orifice is located transversely within the first-main pivot-hinge-extension. The second hinge pin comprises a second bushing having a second bolt passing therethrough, the second bushing and the second bolt removably inserted through the first main pivot-hinge orifice and the second main pivot-hinge orifice, thereby hingedly coupling the right clamp side to the clamp main body.

The clamp main body is preferably integral with the carry handle with the carry handle located coplanar with the clamp main body and at the uppermost portion of the clamp main body. The left clamp side and the right clamp side are hingedly attached to each other via the first hinge-pin located within the first pivot through-hole of the left clamp side and the second pivot through-hole of the right clamp side such that the left clamp side and the right clamp side are able to axially rotate in relation in relation to each other. The right clamp side is hingedly attached to the clamp main body via the second hinge-pin located within the first main pivot-hinge-orifice of the right clamp side and the second-main pivot-hinge-orifice of the second-main pivot-hinge extension such that the right clamp side and the clamp main body are able to axially rotate in relation to each other. The clamp lock is hingedly attached at a central section of the clamp lock to a left side of the clamp main body such that the clamp lock is able to lock the left clamp side to the clamp main body, thereby locking the right clamp side to the clamp main body which comprises a locked condition.

The hose handle clamp assembly is designed to be operable using a single hand for ease of use and convenience. The left clamp side, the right clamp side, and the clamp main body operatively work in conjunction to increase the space between the lower portion of the left clamp side and the right clamp side in order to place the hose handle clamp assembly about the outer circumference (periphery) of a cylindrical object such as a suction hose or the like, and alternately to move the left clamp side and the right clamp side together about the cylindrical object and to lock via the clamp lock, such that a user is able to grip the carry handle of the hose handle clamp assembly and to easily lift and to carry the cylindrical object from a first location to a second location.

A kit is embodied herein for the hose handle system preferably comprising: at least one fully assembled hose handle clamp assembly for removably attaching to a cylindrical object and lift-transporting the cylindrical object from a first location to a second location, and a set of user safety instructions.

In accordance with the embodiments of the present invention a preferred method of use is disclosed herein preferably comprising the steps of: squeezing the thumb lever of the clamp lock toward the handle of the hose handle clamp assembly via the thumb of the user to release-spread the left clamp side and the right clamp side; placing the hose handle clamp assembly over the cylindrical object; pushing downward on the carry handle to position the left clamp side and the right clamp side into the lock-ready position; pushing the thumb lever outward from the handle to lock the hose handle clamp assembly onto the cylindrical object; lift-carrying the cylindrical object from a first location to a second location; squeezing the thumb lever of the clamp lock toward the handle to release the cylindrical object; and storing the hose handle clamp assembly.

The present invention holds significant improvements and serves as a hose handle system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, hose handle system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a gripping device and more particularly to a hose (or other cylindrical object) handling system as used to improve the gripping and ease of lifting and carrying a cylindrical object.

Generally speaking, a hose handle system is a pump suction hose clamp or pipe clamp with a handle attached that a user can place on a suction hose or the like to lift and move the hose from one location to another with relative ease. The hose handle system is designed for easy single handed operation and provides positive gripping of the hose or pipe. The hose handle clamp assembly has a left clamp side that is hinged to a right clamp side, and the right clamp side is attached to a clamp main body. A clamp lock is pivotally attached to the left side of the clamp main body and is able to lock the clamp in a closed condition onto the hose. The present invention may be used in many applications for example carrying rigid or flexible pipe, hoses, and generally long cylindrical object, thus the present disclosure should not be considered limiting as to use/application, but rather that the cylindrical objects carried are as exemplary means and do not limit the scope of the present invention.

Figure 1:
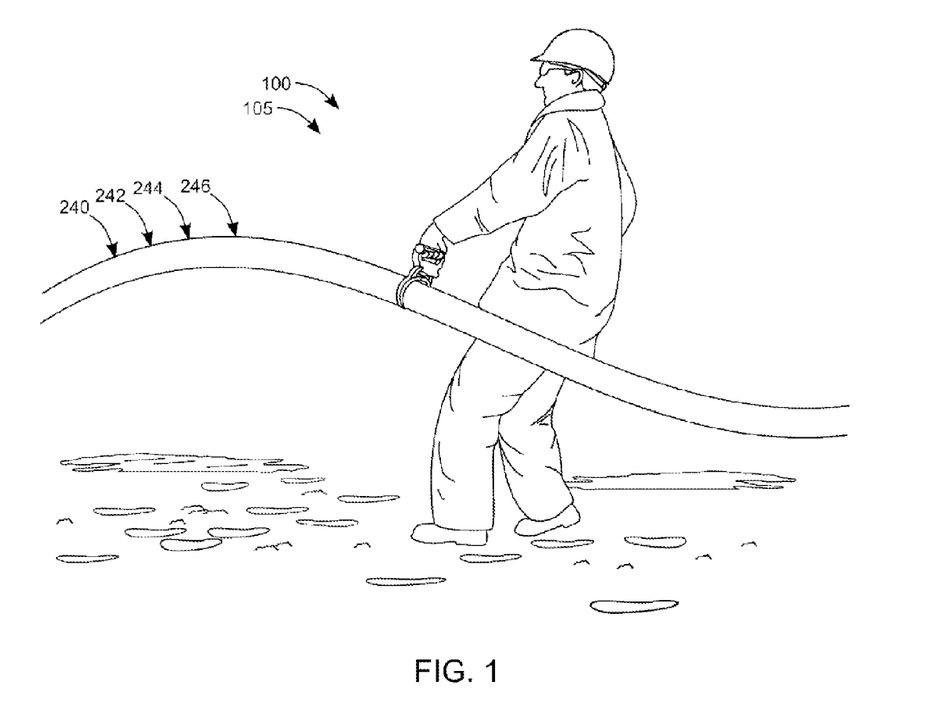
FIG. 1 shows a perspective view illustrating an in-use condition of a hose handle system according to an embodiment of the present invention.

Referring to the drawings by numerals of reference there is shown in FIG. 1, a perspective view illustrating an in-use condition of hose handle system 100 according to an embodiment of the present invention.

Hose handle clamp assembly 105 is useful for quickly coupling to a cylindrical object 240 such as hose 242 or pipe 244, using a single handed operation, and carrying cylindrical object 240 from a first location to a second location, as shown. Hose handle clamp assembly 105 is designed to be operable using a single hand for ease of use and convenience. Left clamp side 110, right clamp side 120, and clamp main body 130 operatively work in conjunction to increase the space between bottom portion 112 of left clamp side 110 and right clamp side 120 in order to place hose handle clamp assembly 105 about the outer circumference of cylindrical object 240 such as pump suction hose 246 or the like, and alternately to move left clamp side 110 and right clamp side 120 together about cylindrical object 240 and to lock via clamp lock 140, such that a user is able to grip carry handle 150 of hose handle clamp assembly 105 and to easily lift and to carry cylindrical object 240 from a first location to a second location. Cylindrical object 240 may comprise a hose 242, pipe 244, but works most effectively on pump suction hose 246.

Figure 2:
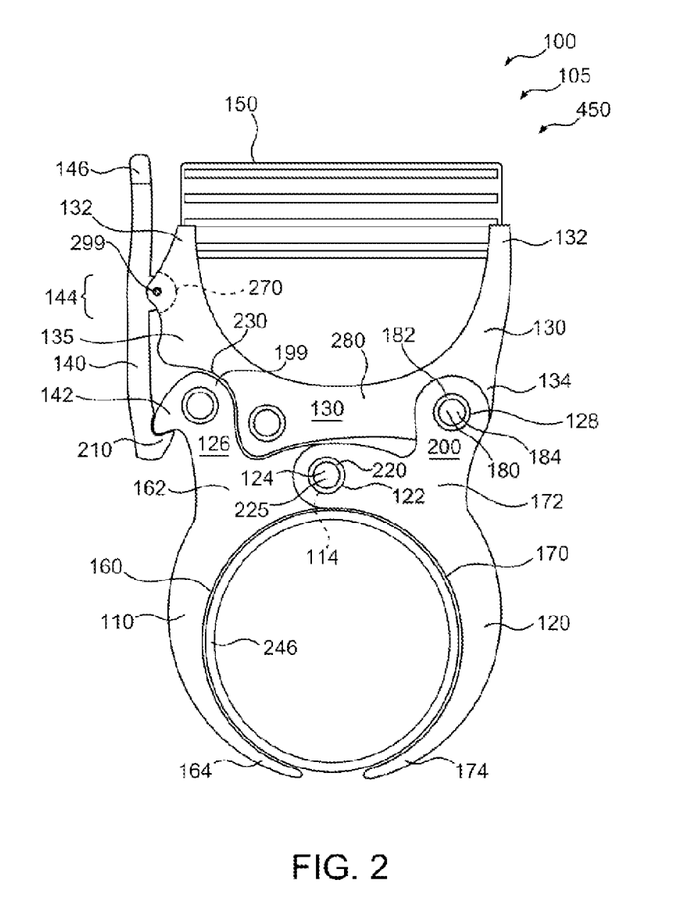
FIG. 2 is a perspective view illustrating the hose handle system according to an embodiment of the present invention of FIG. 1.

Referring now to FIG. 2, a perspective view illustrating hose handle system 100 according to an embodiment of the present invention of FIG. 1.

In general, hose handle clamp assembly 105 may comprise left clamp side 110, right clamp side 120, and clamp main body 130 operatively and hingedly attached one to another in respective order. Hose handle clamp assembly 105 having left clamp side 110 with first pivot through-hole 114, clamp-lock cam 142, left arcuate-hose-grip portion 160, right clamp side 120 having second pivot through-hole 122 and first hinge-pin 124, first main pivot-hinge extension 126 having first main pivot-hinge-orifice 128 with second hinge-pin 180, right arcuate-hose-grip portion 170, clamp main body 130 having carry handle 150, second main pivot-hinge extension 200 having second main pivot-hinge-orifice 205, and clamp lock 140. Other attaching means and rotating means may be employed.

Clamp main body 130 is integral with carry handle 150; with carry handle 150 located coplanar with clamp main body 130 and at uppermost portion 132 of clamp main body 130. Left clamp side 110 and right clamp side 120 are hingedly attached to each other via first hinge-pin 124 located within first pivot through-hole 114 of left clamp side 110 and second pivot through-hole 122 of right clamp side 120 such that left clamp side 110 and right clamp side 120 are able to axially rotate in relation in relation to each other. Right clamp side 120 is hingedly attached to clamp main body 130 via second hinge-pin 180 located within first main pivot-hinge-orifice 128 of right clamp side 120 and second main pivot-hinge-orifice 205 of second main pivot-hinge extension 200 such that right clamp side 120 and clamp main body 130 are able to axially rotate in relation to each other. Clamp lock 140 is hingedly attached at a central section of clamp lock 140 to left clamp side 110 of clamp main body 130 such that clamp lock 140 is able to lock left clamp side 110 to clamp main body 130, thereby locking right clamp side 120 to clamp main body 130 comprising a locked condition.

Figure 3:
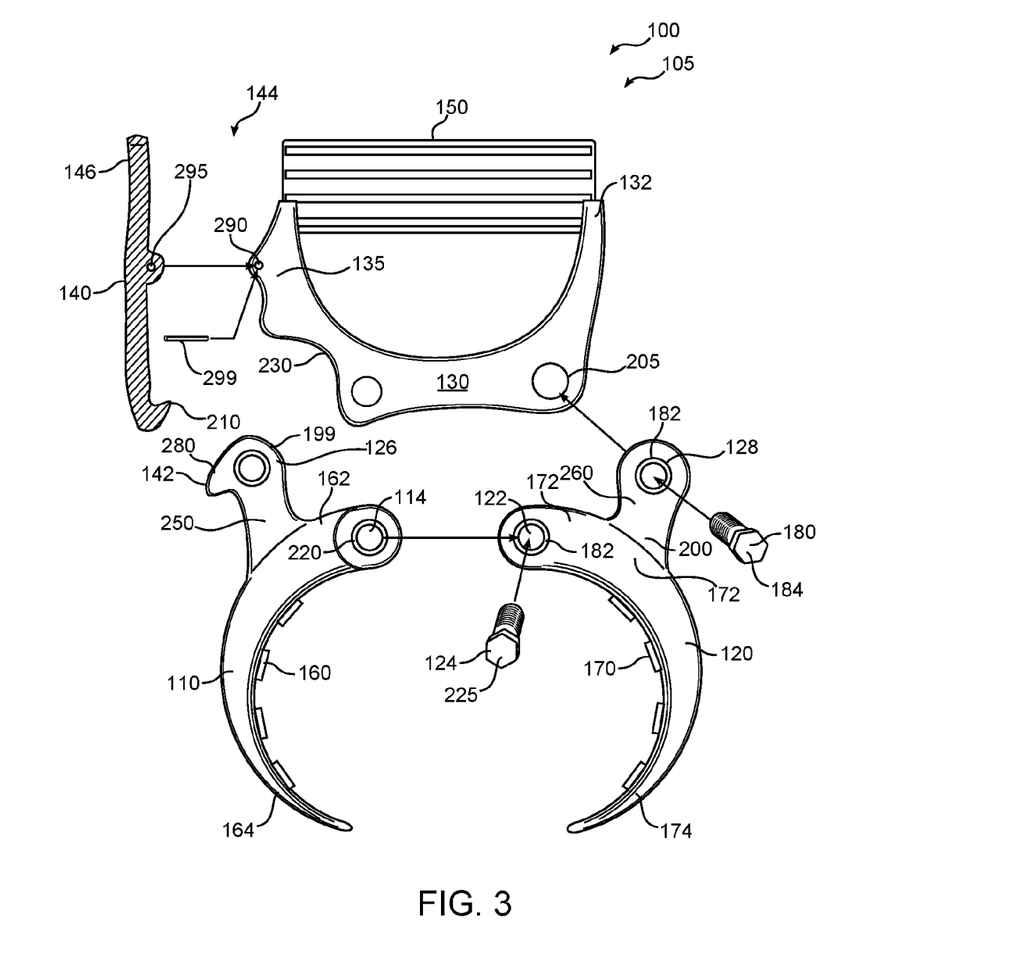
FIG. 3 is an exploded view illustrating the hose handle system according to an embodiment of the present invention of FIG. 1.

Referring now to FIG. 3, an exploded view of hose handle system 100 according to an embodiment of the present invention of FIG. 1.

Second main pivot-hinge extension 200 is located on lower right side 134 of clamp main body 130 which hingedly attaches to right clamp side 120 and right clamp side 120 hingedly attaches to left clamp side 110. Left clamp side 110 comprises left arcuate-hose-grip portion 160 having top portion 162 and bottom portion 164. First pivot through-hole 114 is transversely located through top portion 162 of left clamp side 110. First hinge-pin 124 may have first bushing 220 having first bolt 225 with first bushing 220 and first bolt 225 removably inserted through first pivot through-hole 114 of left clamp side 110 and second pivot through-hole 122 of right clamp side 120, thereby hingedly coupling left clamp side 110 to right clamp side 120.

Right clamp side 120 comprises right arcuate-hose-grip portion 170, right arcuate-hose-grip portion 170 having upper portion 172 and lower portion 174. Clamp-lock cam 142 of left clamp side 110 is located on first elongated protrusion 250, which is integral with left clamp side 110 and upwardly divergent from the curvature of the outer arcuate surface of left clamp side 110. First main pivot-hinge extension 126 of right clamp side 120 is second elongated protrusion 260. Second elongated protrusion 260 is integral with right clamp side 120 and upwardly divergent from the curvature of the outer arcuate surface. Left clamp side 110 and right clamp side 120 each are narrower at the lowermost end than at the uppermost end.

Second pivot through-hole 122 is transversely located through upper portion 172 of right clamp side 120. First main pivot-hinge extension 126 is integral with right clamp side 120 and located tangential to the outer curvature of upper portion 172 of right clamp side 120. First main pivot-hinge-orifice 128 is located transversely within first main pivot-hinge extension 126. Second hinge-pin 180 may comprise second bushing 182 having second bolt 184 passing therethrough, second bushing 182 and second bolt 184 removably inserted through first main pivot-hinge-orifice 128 and second main pivot-hinge-orifice 205, thereby hingedly coupling right clamp side 120 to clamp main body 130.

Figure 4:
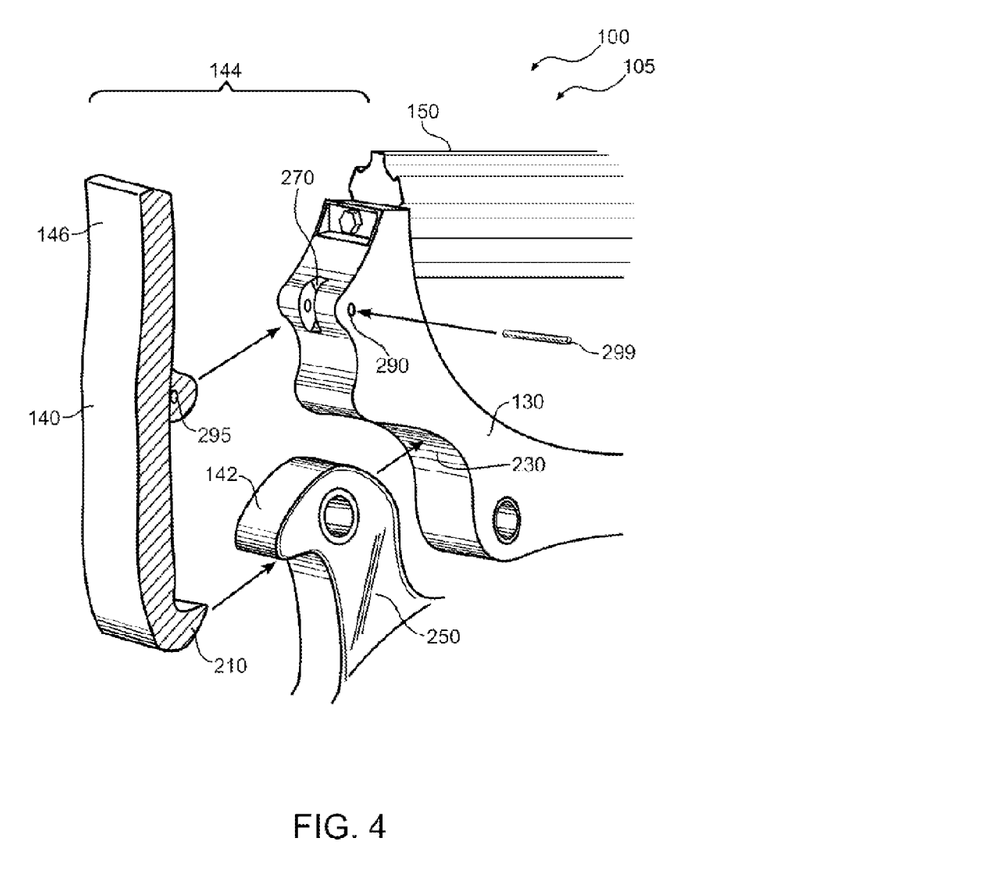
FIG. 4 is a perspective view illustrating the clamp lock of the hose handle system according to an embodiment of the present invention of FIG. 1.

Referring now to FIG. 4, a perspective view illustrating clamp lock 140 of hose handle system 100 according to an embodiment of the present invention of FIG. 1.

Clamp lock 140 is rotatably attached to the edge of left side 135 of clamp main body 130 via clamp lock hinge 144. Clamp-lock cam 142 is integral with left clamp side 110 and located tangential to the convex side of top portion 162 of left clamp side 110. Clamp lock 140 further comprises locking cog 210. Other suitably equivalent locking means may be used. Locking cog 210 is able to frictionally engage clamp-lock cam 142 to place hose handle clamp assembly 105 in a locked condition about the outer periphery of cylindrical object 240 such as pump suction hose 246 or pipe 244.

Clamp lock 140 further comprises thumb lever 146; thumb lever 146 located at an opposing end of clamp lock 140 from locking cog 210. Left side 135 of clamp main body 130 comprises semi-circular recess 230 that back side 199 of clamp-lock cam 142 is able to be nestably located within during a locked clamp condition. Clamp main body 130 comprises arcuate hinge slot 270 located in left side 135 of clamp main body 130 between front side 280 and back side 285 having first roll-pin orifice 290 transversely passing through arcuate hinge slot 270. Clamp lock 140 comprises second roll-pin orifice 295, first roll-pin orifice 290 and second roll-pin orifice 295 align and are rotatably coupled via the frictionally inserted roll-pin 299. Arcuate hinge slot 270 is located within a rounded protrusion on left side 135 of clamp main body 130. Front side 280 of clamp-lock cam 142 is frictionally engaged with locking cog 210 of clamp lock 140 during a locked condition.

Hose handle system 100 may be sold as kit 450 comprising the following parts: at least one fully assembled hose handle clamp assembly 105 for removably attaching to cylindrical object 240 and lift-transporting cylindrical object 240 from a first location to a second location; and at least one set of user safety instructions. The kit has instructions such that functional relationships are detailed in relation to the structure of the invention (such that the invention can be used, maintained, or the like in a preferred manner). Hose handle system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different hinge/rotation combinations, parts may be sold separately, etc., may be sufficient.

Figure 5:
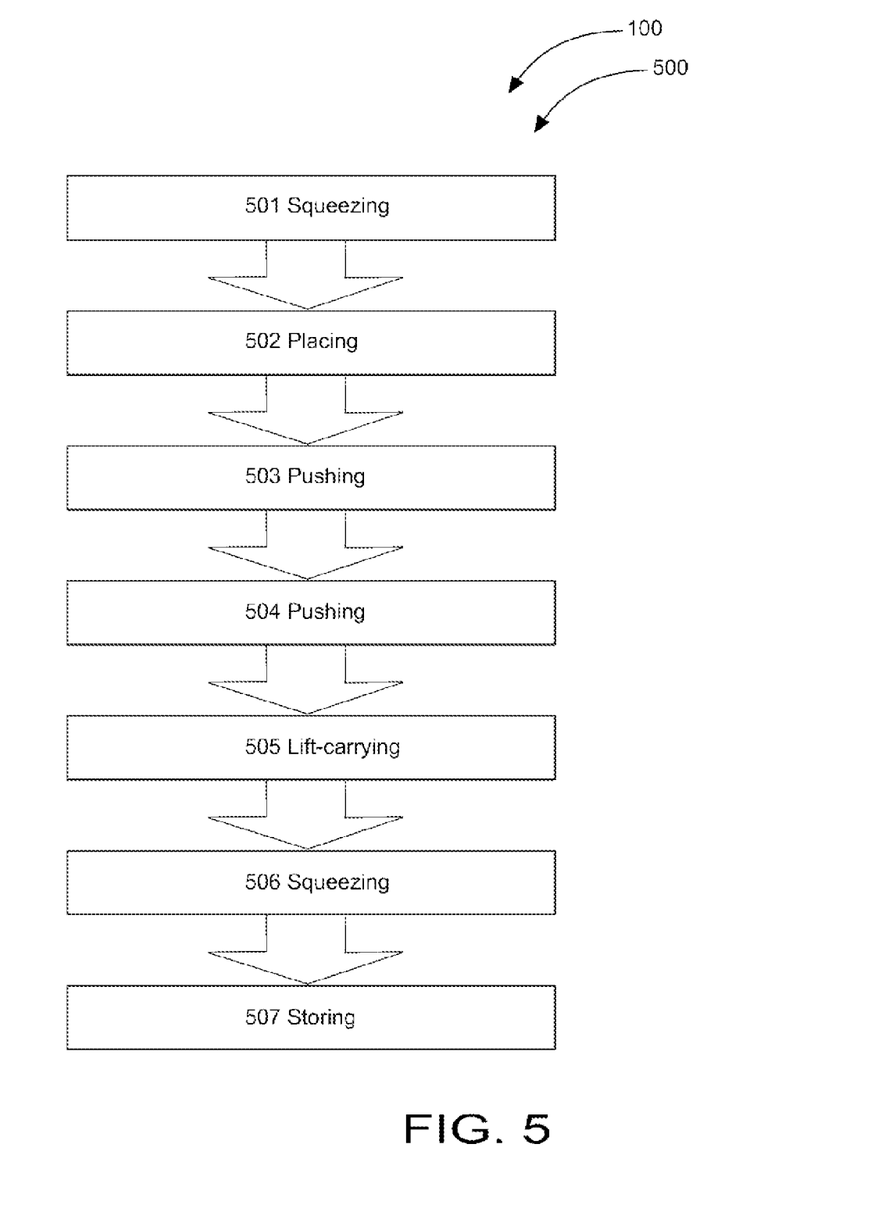
FIG. 5 is a flowchart illustrating a method of use for hose handle system according to an embodiment of the present invention of FIGS. 1-4.

Referring now to FIG. 5, showing method of use 500 for hose handle system 100. A method of using (method of use 500) hose handle system 100 may comprise the steps of step one 501 squeezing thumb lever 146 of clamp lock 140 toward carry handle 150 of hose handle clamp assembly 105 via the thumb of the user to release-spread left clamp side 110 and right clamp side 120; step two 502 placing hose handle clamp assembly 105 over cylindrical object 240; step three 503 pushing downward on carry handle 150 to position left clamp side 110 and right clamp side 120 into the lock-ready position; step four 504 pushing thumb lever 146 outward from carry handle 150 to lock hose handle clamp assembly 105 onto cylindrical object 240; step five 505 lift-carrying cylindrical object 240 from a first location to a second location; step six 506 squeezing thumb lever 146 of clamp lock 140 toward carry handle 150 to release cylindrical object 240; and step seven 507 storing hose handle clamp assembly 105.

It should be noted that steps 501-504 are optional steps and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A hose handling system comprising:
   a hose handle clamp assembly having;
      a left clamp side having;
         a first pivot through-hole;
         a clamp-lock cam; and
         a left arcuate-hose-grip portion;
      a right clamp side having;
         a second pivot through-hole having a first hinge-pin;
         a first main pivot-hinge extension having;
            a first main pivot-hinge-orifice having a second hinge-pin; and
         a right arcuate-hose-grip portion;
      a clamp main body having;
         a carry handle;
         a second main pivot-hinge extension having;
            a second main pivot-hinge-orifice; and
         a clamp lock;
   wherein said hose handling system comprises said hose handle clamp assembly useful for coupling to a cylindrical object and carrying said cylindrical object from a first location to a second location;
   wherein said hose handle clamp assembly comprises said left clamp side, said right clamp side, and said clamp main body, operatively and hingedly attached one to another in respective order;
   wherein said left clamp side comprises said left arcuate-hose-grip portion, said left arcuate-hose-grip portion comprising a top portion and a bottom portion;
   wherein said first pivot through-hole is transversely located through said top portion of said left clamp side;
   wherein said clamp-lock cam is integral with said left clamp side and located tangential to a convex side of said top portion of said left clamp side;

wherein said right clamp side comprises said right arcuate-hose-grip portion, said right arcuate-hose-grip portion comprising an upper portion and a lower portion;

wherein said second pivot through-hole is transversely located through said upper portion of said right clamp side;

wherein said first-main pivot-hinge-extension is integral with said right clamp side and located tangential to an outer curvature of said upper portion of said right clamp side;

wherein said first-main pivot-hinge-orifice is located transversely within said first-main pivot-hinge-extension;

wherein said clamp main body is integral with said carry handle, said carry handle located coplanar with said clamp main body and at an uppermost portion of said clamp main body;

wherein said left clamp side and said right clamp side are hingedly attached to each other via said first hinge-pin located within said first pivot through-hole of said left clamp side and said second pivot through-hole of said right clamp side such that said left clamp side and said right clamp side are able to axially rotate in relation to each other;

wherein said right clamp side is hingedly attached to said clamp main body via said second hinge-pin located within said first main pivot-hinge-orifice of said right clamp side and said second-main pivot-hinge-orifice of said second-main pivot-hinge extension such that said right clamp side and said clamp main body are able to axially rotate in relation to each other;

wherein said clamp lock is hingedly attached at a central section of said clamp lock to a left side of said clamp main body such that said clamp lock is able to lock said left clamp side to said clamp main body, thereby locking said right clamp side to said clamp main body comprising a locked condition; and wherein said left clamp side, said right clamp side, and said clamp main body operatively work in conjunction to increase a distance between said left clamp side and said right clamp side in order to place said hose handle clamp assembly about an outer circumference of said cylindrical object, and alternately to move said left clamp side and said right clamp side together about said cylindrical object and to lock via said clamp lock, such that a user is able to grip said carry handle of said hose handle clamp assembly and to easily lift and to carry said cylindrical object from said first location to said second location.

2. The hose handling system of claim 1 wherein said clamp lock further comprises a locking cog, said locking cog able to frictionally engage said clamp lock cam to place said hose handle clamp assembly in a locked condition about an outer periphery of said cylindrical object.

3. The hose handling system of claim 2 wherein said clamp lock further comprises a thumb lever, said thumb lever located at an opposing end from said locking cog.

4. The hose handling system of claim 3 wherein said clamp lock is rotatably attached to an edge of said left side of said clamp main body via a clamp lock hinge.

5. The hose handling system of claim 1 wherein said left side of said clamp main body comprises a semi-circular recess such that a back side of said clamp-lock cam is able to be nestably located within said semi-circular recess during said locked condition.

6. The hose handling system of claim 1 wherein said clamp main body comprises an arcuate hinge slot located in said left side of said clamp main body between a front side and a back side having a first roll-pin orifice transversely passing through said arcuate hinge slot.

7. The hose handling system of claim 6 wherein said arcuate hinge slot is located within a rounded protrusion on said left side of said clamp main body.

8. The hose handling system of claim 6 wherein said clamp lock comprises a second roll-pin orifice, said first roll-pin orifice and said second roll-pin orifice align and are rotatably coupled via a frictionally inserted roll-pin.

9. The hose handling system of claim 1 wherein said second main pivot-hinge extension is located on a lower right side of said clamp main body.

10. The hose handling system of claim 1 wherein said first hinge pin comprises a first bushing having a first bolt passing therethrough, said first bushing and said first bolt removably inserted through said first pivot through-hole and said second pivot through-hole thereby hingedly coupling said left clamp side to said right clamp side.

11. The hose handling system of claim 1 wherein said second hinge pin comprises a second bushing having a second bolt passing therethrough, said second bushing and said second bolt removably inserted through said first main pivot-hinge orifice and said second main pivot-hinge orifice, thereby hingedly coupling said right clamp side to said clamp main body.

12. The hose handling system of claim 1 wherein said left clamp side and said right clamp side each are narrower at a lowermost end than at an uppermost end.

13. The hose handling system of claim 1 wherein said clamp lock cam of said left clamp side is located on an elongated protrusion, said elongated protrusion is integral with said left clamp side and upwardly divergent from a curvature of said outer arcuate surface of said left clamp side.

14. The hose handling system of claim 1 wherein said first main pivot-hinge extension of said right clamp side is an elongated protrusion, said elongated protrusion is integral with said right clamp side and upwardly divergent from a curvature of outer arcuate surface of said right clamp side.

15. The hose handling system of claim 1 wherein said carry handle is attached at a top-side of a D-shaped finger opening of said clamp main body.

16. The hose handling system of claim 1 wherein said hose handle clamp assembly is operable using a single hand of said user.

17. The hose handling system of claim 1 wherein said front side of said clamp-lock cam is frictionally engaged with said cog of said clamp lock during said locked condition.

18. A hose handling system comprising:
   a hose handle clamp assembly having;
      a left clamp side having;
         a first pivot through-hole;
         a clamp-lock cam; and
         a left arcuate-hose-grip portion;
      a right clamp side having;
         a second pivot through-hole having a first hinge-pin;
         a first main pivot-hinge extension having;
            a first main pivot-hinge-orifice having a second hinge-pin; and
         a right arcuate-hose-grip portion;
      a clamp main body having;
         a carry handle;
         a second main pivot-hinge extension having;
            a second main pivot-hinge-orifice; and
         a clamp lock;
   wherein said hose handling system comprises said hose handle clamp assembly useful for coupling to a cylindrical object and carrying said cylindrical object from a first location to a second location;

wherein said hose handle clamp assembly comprises said left clamp side, said right clamp side, and said clamp main body, operatively and hingedly attached one to another in respective order;

wherein said second main pivot-hinge extension is located on a lower right side of said clamp main body;

wherein said left clamp side comprises said left arcuate-hose-grip portion, said left arcuate-hose-grip portion comprising a top portion and a bottom portion;

wherein said first pivot through-hole is transversely located through said top portion of said left clamp side;

wherein said first hinge pin comprises a first bushing having a first bolt passing therethrough, said first bushing and said first bolt removably inserted through said first pivot through-hole and said second pivot through-hole thereby hingedly coupling said left clamp side to said right clamp side;

wherein said clamp lock is rotatably attached to an edge of said left side of said clamp main body via a clamp lock hinge;

wherein said clamp-lock cam is integral with said left clamp side and located tangential to a convex side of said top portion of said left clamp side;

wherein said clamp lock further comprises a locking cog, said locking cog able to frictionally engage said clamp lock cam to place said hose handle clamp assembly in a locked condition about an outer periphery of said cylindrical object;

wherein said clamp lock further comprises a thumb lever, said thumb lever located at an opposing end from said locking cog;

wherein said left side of said clamp main body comprises a semi-circular recess such that a back side of said clamp-lock cam is able to be nestably located within said semi-circular recess during said locked condition;

wherein said clamp main body comprises an arcuate hinge slot located in said left side of said clamp main body between a front side and a back side having a first roll-pin orifice transversely passing through said arcuate hinge slot;

wherein said clamp lock comprises a second roll-pin orifice, said first roll-pin orifice and said second roll-pin orifice align and are rotatably coupled via a frictionally inserted roll-pin;

wherein said arcuate hinge slot is located within a rounded protrusion on said left side of said clamp main body;

wherein said front side of said clamp-lock cam is frictionally engaged with said cog of said clamp lock during said locked condition;

wherein said right clamp side comprises said right arcuate-hose-grip portion, said right arcuate-hose-grip portion comprising an upper portion and a lower portion;

wherein said clamp lock cam of said left clamp side is located on an elongated protrusion, said elongated protrusion is integral with said left clamp side and upwardly divergent from a curvature of outer arcuate surface of said left clamp side;

wherein said first main pivot-hinge extension of said right clamp side is an elongated protrusion, said elongated protrusion is integral with said right clamp side and upwardly divergent from a curvature of said outer arcuate surface of said right clamp side;

wherein said left clamp side and said right clamp side each are narrower at a lowermost end than at an uppermost end;

wherein said second pivot through-hole is transversely located through said upper portion of said right clamp side;

wherein said second hinge pin comprises a second bushing having a second bolt passing therethrough, said second bushing and said second bolt removably inserted through said first main pivot-hinge orifice and said second main pivot-hinge orifice, thereby hingedly coupling said right clamp side to said clamp main body;

wherein said first-main pivot-hinge-extension is integral with said right clamp side and located tangential to an outer curvature of said upper portion of said right clamp side;

wherein said first-main pivot-hinge-orifice is located transversely within said first-main pivot-hinge-extension;

wherein said clamp main body is integral with said carry handle, said carry handle located coplanar with said clamp main body and at an uppermost portion of said clamp main body;

wherein said left clamp side and said right clamp side are hingedly attached to each other via said first hinge-pin located within said first pivot through-hole of said left clamp side and said second pivot through-hole of said right clamp side such that said left clamp side and said right clamp side are able to axially rotate in relation in relation to each other;

wherein said right clamp side is hingedly attached to said clamp main body via said second hinge-pin located within said first main pivot-hinge-orifice of said right clamp side and said second-main pivot-hinge-orifice of said second-main pivot-hinge extension such that said right clamp side and said clamp main body are able to axially rotate in relation to each other;

wherein said clamp lock is hingedly attached at a central section of said clamp lock to a left side of said clamp main body such that said clamp lock is able to lock said left clamp side to said clamp main body, thereby locking said right clamp side to said clamp main body comprising a locked condition;

wherein said hose handle clamp assembly is operable using a single hand of said user;

wherein said left clamp side, said right clamp side, and said clamp main body operatively work in conjunction to increase a distance between said left clamp side and said right clamp side in order to place said hose handle clamp assembly about an outer circumference of said cylindrical object, and alternately to move said left clamp side and said right clamp side together about said cylindrical object and to lock via said clamp lock, such that a user is able to grip said carry handle of said hose handle clamp assembly and to easily lift and to carry said cylindrical object from said first location to said second location.

19. The hose handling system of claim 18 further comprising a kit including:
at least one fully assembled said hose handle clamp assembly for removably attaching to said cylindrical object and lift-transporting said cylindrical object from said first location to said second location; and
a set of user safety instructions.

* * * * *